United States Patent [19]
Lo

[11] Patent Number: 5,349,403
[45] Date of Patent: Sep. 20, 1994

[54] PHOTOGRAPHIC CAMERA FOR PRODUCING STEROGRAPHIC AND MONO PHOTOGRAPHS

[76] Inventor: Anthony Lo, 12 A Olympian Mansion, 9 Conduit Rd., Hong Kong, Hong Kong

[21] Appl. No.: 510,678

[22] Filed: Apr. 18, 1990

[30] Foreign Application Priority Data

Apr. 28, 1989 [GB] United Kingdom ........... 8909757

[51] Int. Cl.⁵ .............................. G03B 35/08
[52] U.S. Cl. ............................ 354/114; 354/117
[58] Field of Search ............. 354/114, 115, 117

[56] References Cited

U.S. PATENT DOCUMENTS

| | | | |
|---|---|---|---|
| 3,815,970 | 6/1974 | Murphy | 354/117 |
| 4,844,583 | 7/1989 | Lo | 354/114 X |
| 4,911,530 | 3/1990 | Lo | 354/114 X |

OTHER PUBLICATIONS

Bandai advertisement, "3D Snapshot Camera", Jan. 1987.

Primary Examiner—Howard B. Blankenship
Attorney, Agent, or Firm—Finnegan, Henderson, Farabow, Garrett & Dunner

[57] ABSTRACT

A photographic camera for use in producing stereographic and mono photographic images. The camera is provided with a reflector system comprising reflectors, lenses and shutters for use in projecting two images onto a light sensitive recording medium in side-by-side relationship to produce a stereograph print, Means, such as obturators, are provided for rendering the reflector system inoperative when the camera is used for projecting a single image through a lens and shutter onto the light sensitive recording medium to produce a mono photograph.

10 Claims, 3 Drawing Sheets ance apertures 25 and 26 are open. Light passing through the aperture 10a is reflected by the reflector 17 through the lens 19 and the shutter 20 onto the reflector 18 which reflects the light through the aperture 25 onto one half of the film 16. Similarly light passing through the aperture 10b is reflected by the reflector 21 through the lens 23 and the shutter 24 onto the reflector 22 which reflects the light through the aperture 26 onto the other half of the film 16. In this way, two images are projected in side-by-side relationship onto the film 16 to produce a stereograph. The shutters 20 and 24 and iris 32 operate simultaneously.

PHOTOGRAPHIC CAMERA FOR PRODUCING STEROGRAPHIC AND MONO PHOTOGRAPHS

BACKGROUND OF THE INVENTION

This invention relates to a photographic camera for use in producing stereographic and mono photographs.

A camera for use in producing stereographs has always been regarded as being a specialist camera suitable only for use by experienced photographers.

It is known to provide a reflector device having two reflector systems which can be attached to a single lens photographic camera to convert the camera into one for producing stereographs. Such a device is often regarded as being more of a novelty item rather than a substitute for a stereo camera. This is because the angle of view is limited and the joint between the stereo pair of prints is either a dark band or a double exposed band whose width is affected by the size of the camera lens iris.

SUMMARY OF THE INVENTION

According to the present invention, there is provided a photographic camera for use in producing stereoscopic and mono photographic images, including as an integral part thereof a reflector system for use in projecting two images onto a light sensitive recording medium in side-by-side relationship to produce a stereograph. Means are provided for rendering the reflector system inoperative when the camera is used for projecting a single image onto the light sensitive recording medium to produce a mono photograph.

In one embodiment, at least part of the reflector system is movable between an operative position in which it projects the two images through a lens system onto the recording medium and an inoperative position in which the two images are not reflected by the reflector system through the common lens. Instead, only a single image is projected through the common lens system or through another lens onto the recording film.

In another embodiment, the reflector system may comprise a first series of reflectors and lens for reflecting a first image and a second series of reflectors and lens for reflecting a second image. Each system is provided with an obturator movable between an open position in which it allows the respective image to be projected onto the light sensitive recording medium and a position in which it prevents the respective image from being projected onto the light sensitive recording medium. A separate lens system is provided for use in projecting a single image onto the light sensitive recording medium. The separate lens system is provided with an obturator movable between an open position at times when the other obturators are closed to allow a single image to be projected through the separate lens system onto the light sensitive recording medium and a closed position at times when the other obturators are open to prevent the single image from being projected through said separate lens system.

The accompanying drawings, which are incorporated in and constitute a part of the specification, illustrate one embodiment of the invention and together with the written description serve to explain the principles of the invention.

BRIEF DESCRIPTION OF THE DRAWINGS

Some embodiments of the invention will now be described, by way of example, with reference to the accompanying drawings, in which.

DESCRIPTION OF THE PREFERRED EMBODIMENTS

Figure 1:
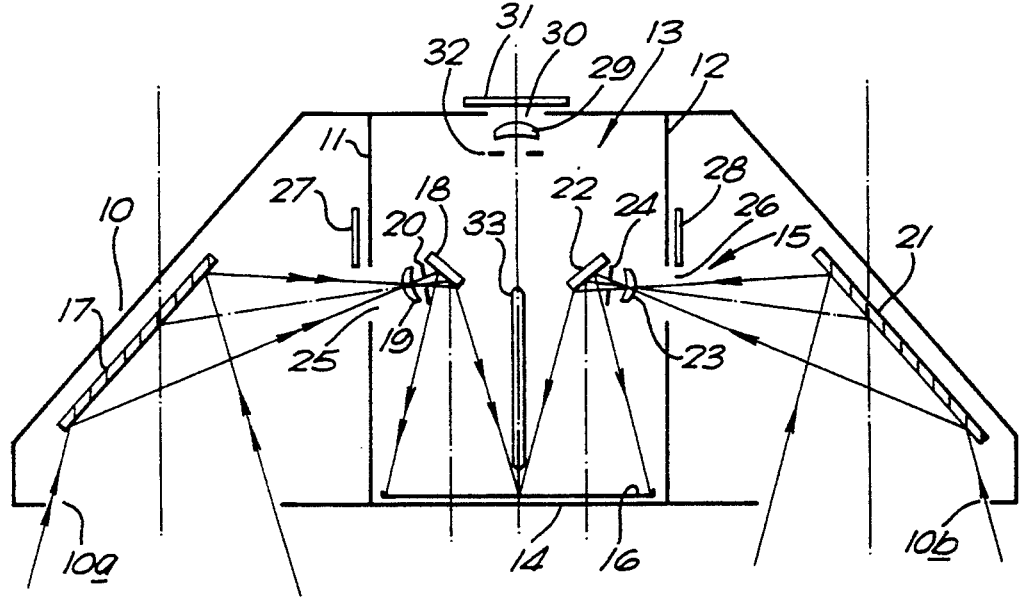
FIG. 1 is a diagrammatic horizontal cross section through a first embodiment of a camera embodying the present invention showing the reflector system in the mode for producing stereographs.
Figure 2:
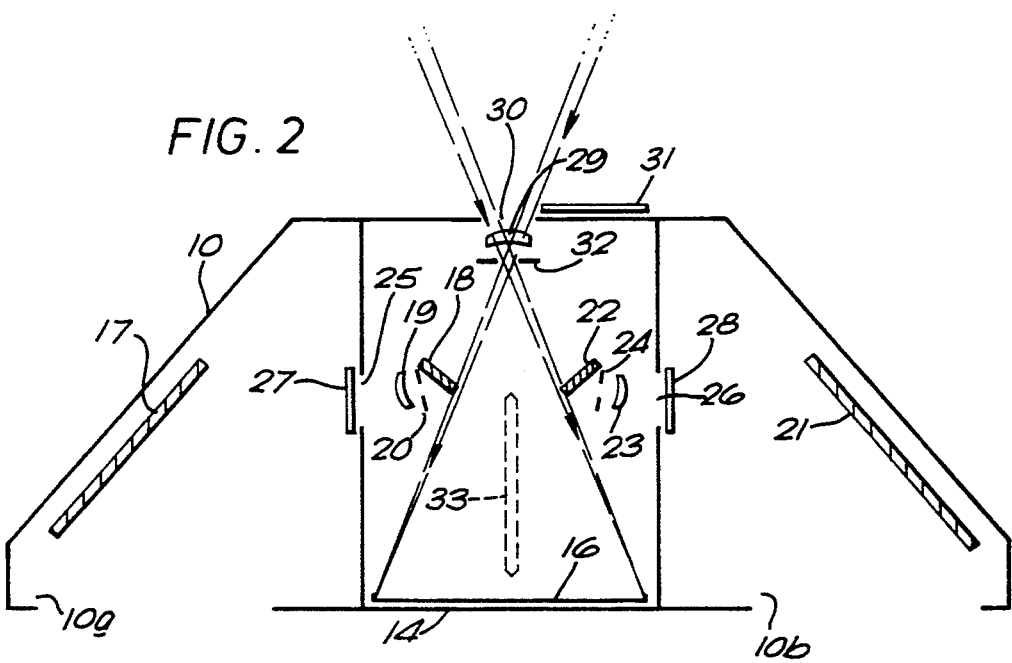
FIG. 2 is a diagrammatic horizontal cross section similar to that of FIG. 1 showing the reflector system inoperative when the camera is being used to produce mono photographs.

The camera shown in FIGS. 1 and 2 comprises a casing 10 provided internally with transverse partitions 11 and 12 to form a chamber 13. Provided at one end of the chamber 13 is a film support 14 which may be flat as shown or concave. Housed within the casing 10 is a reflector system 15 for use in reflecting two images in side-by-side relationship onto a light sensitive recording medium 16, such as photographic roll film, to produce a stereograph. The reflector system 15 comprises a first series of reflectors 17 and 18 which include a lens 19 and an iris-type shutter 20, and a second series of reflectors 21 and 22 which include a lens 23 and an iris-type shutter 24. The reflector 17 receives light from an aperture 10a and reflects the light onto the reflector 18 through an aperture 25 provided in the partition 11 and the reflector 21 receives light from an aperture 10b and reflects the light onto the reflector 22 through an aperture 26 provided in the partition 12. The aperture 25 is controlled by an obturator 27 and the aperture 26 is controlled by an obturator 28.

An end wall of the chamber 13 is provided with a lens 29 which receives light through an aperture 30 controlled by an obturator 31. An iris-type shutter 32 is provided.

Movable into the chamber 13 is a transversely extending movable partition member 33. Partition member 33 is movable between the operative position shown in FIG. 1 and an inoperative position. When in the inoperative position, partition 33 can be folded down into the film chamber, or may be otherwise moved to a position where it does not interfere in any manner with the single image projected by lens 29 onto light sensitive recording medium 16.

In the mode for producing a stereograph, as shown in FIG. 1, the obturator 31 is moved to the position in which it closes the aperture 30 and the obturators 27 and 28 are moved to the position in which the respective apertures 25 and 26 are open. The partition member 33 is moved to its operative position which prevents light reflected by the respective reflectors 18 and 22 through the shutters 20, 24 and lenses 19, 23 from straying onto the adjacent image formed on the light sensitive recording medium 16 and produces a straight line between the images. The film 16 can be processed in a conventional manner, and the resulting stereograph viewed through a viewing device produces the stereographic effect.

In the mode for producing mono photographs, as shown in FIG. 2, the obturator 31 is moved into the position in which the aperture 30 is open and the obturators 27 and 28 are moved to the position in which the respective apertures 25 and 26 are closed. The partition member 33 is retracted. Thus, light is able to be passed through the aperture 30 to the lens 29 and projected through the iris-type shutter 32 onto the film 16 to produce a mono photograph.

It will be appreciated that the camera has to be rotated through 180 degrees when changing from one mode to the other and will be provided with either two view finders or a single view finder which can be rotated between two operative positions.

Figure 3:
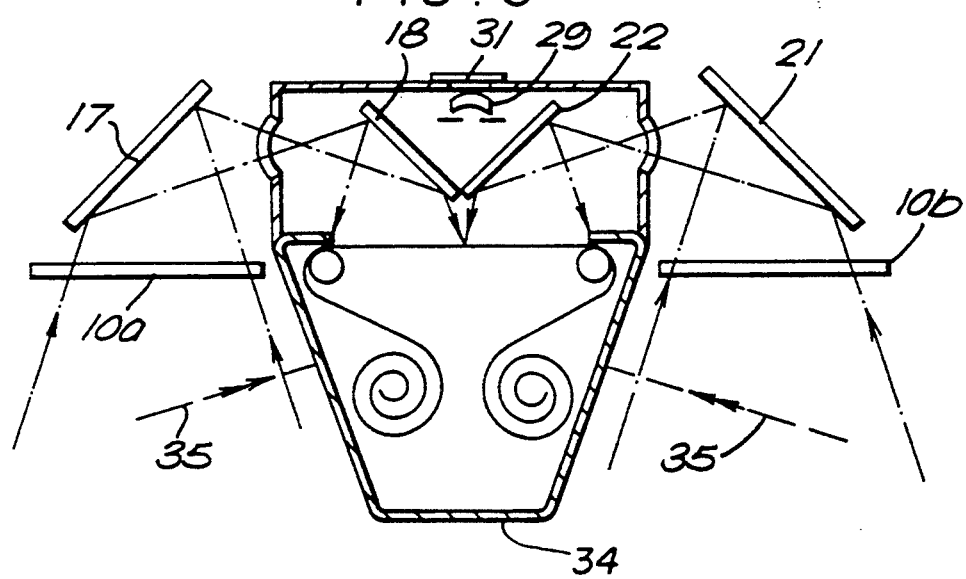
FIG. 3 is a diagrammatic horizontal cross section showing a modification which can be made to the camera shown in FIGS. 1 and 2.

FIG. 3 illustrates a camera similar to the one described with reference to FIGS. 1 and 2. Similar reference numerals have been used on FIG. 3 to indicate the parts which correspond to those described with reference to FIGS. 1 and 2. In this modified form of camera, the film 16 is housed in a casing part 34 which projects outwardly and rearwardly from the casing 10 between the protective pieces of glass 60 and 64. The casing part 34 may be integral with the casing 10 or it may be detachably mounted on the casing 10 and may form a cassette for the film 16. The casing part 34 prevents stray light rays, as indicated by the arrows 35, from outside the viewing range of the reflectors 17, 21 from being projected onto the reflectors 18, 22 and onto the film 16. If such stray light rays 35 were allowed to be reflected into the camera they would produce unwanted ghost images on the photograph.

Figure 4:
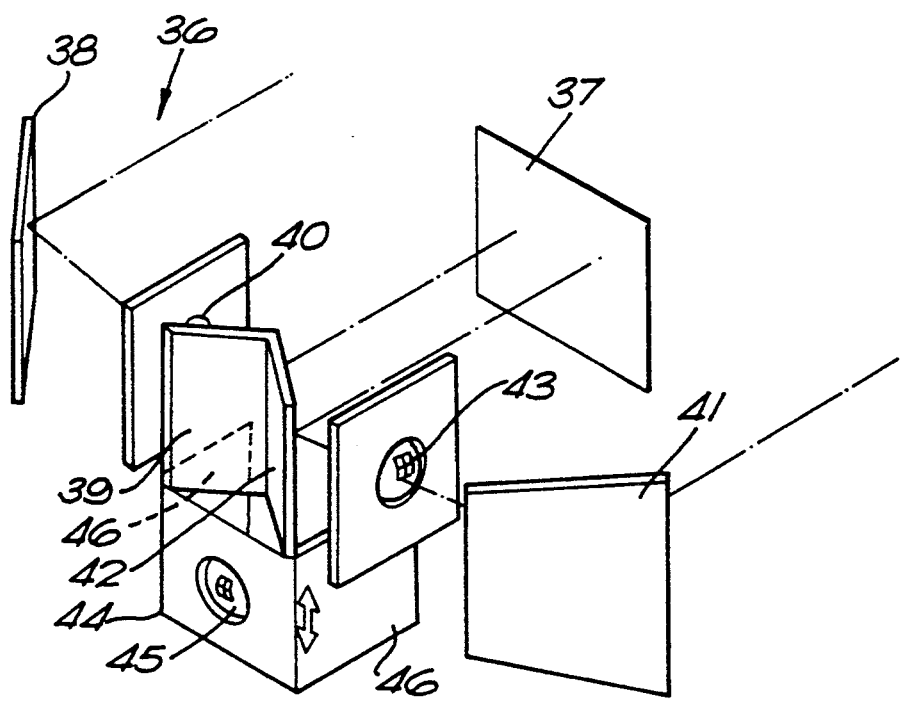
FIG. 4 is a diagrammatic perspective view of a second embodiment of a camera embodying the present invention showing the reflector system in the mode for producing stereographs.

FIG. 4 illustrates another embodiment of a camera according to the present invention. The camera casing is not shown. Housed within the casing is a reflector system 36 for use in reflecting two images in side-by-side relationship on a light sensitive recording medium, such as a film 37, to produce a stereograph. The reflector system 36 comprises a first series of reflectors 38 and 39 which include a lens 40, and a second series of reflectors 41 and 42 which include a lens 43. The lens 40, 43 and reflectors 38, 41 are fixed. The reflectors 39 and 42 are mounted on a member 44 having a front wall provided with a lens 45 and side walls 46. The member 44 is movable between the position shown in FIG. 4 which is the stereo mode and a position for use in mono mode. In the stereo mode, the reflectors 39 and 42 reflect light from the respective lens 40, 43 onto the film 37. In order to place the camera in the mono mode, the member 44 is moved upwardly so that the reflectors 39 and 42 are not aligned with their respective lens 40, 43 and the lens 45 projects light onto the film 37 to produce a mono photograph. In this position, the side walls 46 block off the lenses 40 and 43. Alternatively, member 44 can be designed to be rotated, instead of having a sliding motion.

Figure 5:
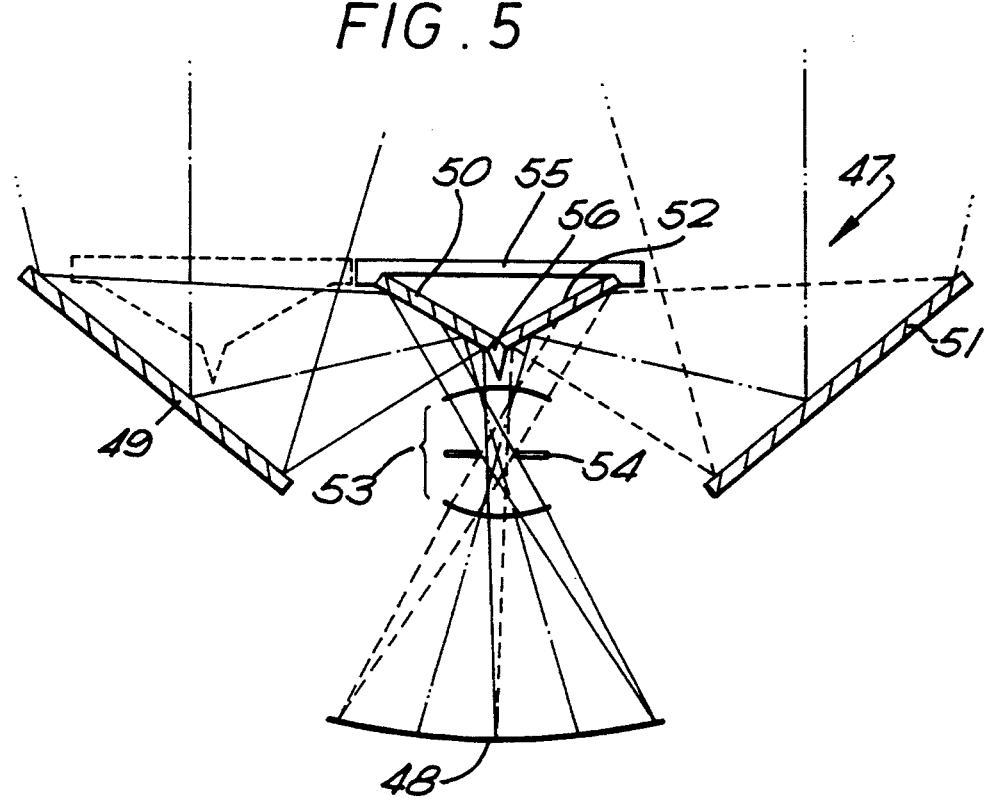
FIG. 5 is a diagrammatic horizontal cross section through a third embodiment of a camera embodying the present invention showing the reflector system in the mode for producing stereographs.
Figure 6:
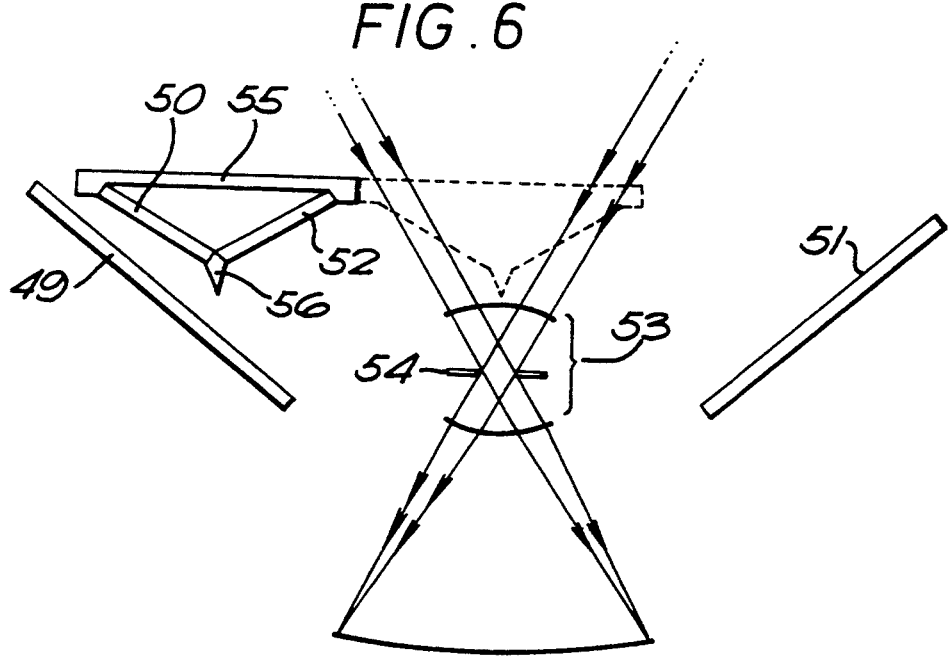
FIG. 6 is a diagrammatic horizontal cross section similar to that of FIG. 5 showing the reflector system inoperative when the camera is being used to produce mono photographs.

FIGS. 5 and 6 illustrate yet another embodiment of a camera according to the present invention. The camera casing is not shown. Housed within the casing is a reflector system 47 for use in reflecting two images in side-by-side relationship onto a light sensitive recording medium, such as a film provided on a curved film support 48, to produce a stereograph.

The reflector system comprises a first series of reflectors 49 and 50 and a second series of reflectors 51 and 52. The reflectors 50 and 52 project through a common lens 53 and an iris-type shutter 54. The reflectors 50 and 52 are mounted on a slidable member 55 and at the intersection of the reflectors there is provided a partition mask 56.

In the stereo mode shown in FIG. 5, reflectors 49, 50 and 51, 52 project respective images through the lens 53 when the shutter 54 is open. The partition mask 56 serves the same purpose as the partition member 33 of FIGS. 1 and 2. The curved film support 48 minimizes pin-cushion distortion produced by the lens 53 and produces a more acceptable matched pair of stereo images.

In the mono mode shown in FIG. 6, the slidable member 55 is slid to a position in which the reflectors 50 and 52 cannot reflect light onto the film and fully exposes the lens 53 to the subject being photographed and thus produces a mono photograph. In the mono mode, light enters the camera through a central aperature (not shown) in the direction indicated by arrow 62 in FIG. 6. When in the stereo mode, slidable member 55 acts to close off the central aperature.

Preferably, in all of the embodiments, the iris-type shutters 20, 24, 32, 54 are of fixed width, but variable in depth. The present invention can also be fitted with a focal plane shutter. Such a shutter protects the film from exposure while switching between the mono and stereo modes.

In all of the embodiments, the reflector system and lens system are arranged such that the camera can produce stereo pairs of photographs or mono photographs at the flick of a switch which changes the camera from one mode to another. It will be apparent to those skilled in the art that various modifications and variations can be made in the camera of the present invention without departing from the scope or spirit of the present invention. Thus, it is intended that the present invention cover the modifications and variations of the invention which come within the scope of the appended claims or their equivalents.

What is claimed is:

1. A camera for producing stereoscopic and mono photo graphic images, the camera comprising:
   a camera casing having a chamber formed therein;
   a reflector system for projecting two images onto a light sensitive recording medium in side-by-side relationship to produce a stereograph, said reflector system being moveably mounted within the chamber of the camera casing for movement between an operative and an inoperative condition, said reflector system including means for reflecting the two images toward the light sensitive recording medium and a partition positioned relative to the reflecting means to separate the two image projected onto the light sensitive recording medium;
   means for projecting a single image onto the light sensitive recording medium to produce a mono photograph at times when the reflector system is in the inoperative condition; and
   means for moving the reflector system within the camera casing between the operative and inoperative condition.

2. The camera of claim 1, wherein said reflecting means of the reflector system includes first and second reflectors and a first lens for projecting the first image, and third and fourth reflectors and a second lens for projecting the second image, and the projecting means includes a third lens for projecting said single image.

3. A camera for producing stereoscopic and mono photographic images, the camera comprising:
- a camera casing having a chamber formed therein;
- a reflector system for projecting two images onto a light sensitive recording medium in side-by-side relationship to produce a stereograph, said reflector system having an operative and an inoperative condition, said reflector system being slidably mounted within the chamber of the casing for movement between the operative and inoperative condition;
- means for projecting a single image onto the light sensitive recording medium to produce a mono photograph at times when the reflector system is in the inoperative condition; and
- means for moving the reflector system within the camera casing between the operative and inoperative condition.

4. A camera for producing stereoscopic and mono photographic images, the camera comprising:
- a reflector system for projecting two images onto a light sensitive recording medium in side-by-side relationship to produce a stereograph, said reflector system having an operative and an inoperative condition, said reflector system including first and second reflectors and a first lens for projecting the first image, and third and fourth reflectors and a second lens for projecting the second image, the reflector system further comprising a first obturator disposed between the first and second reflector and a second obturator disposed between the third and fourth reflector, said first and second obturators having an open position for allowing light to pass between the first and second reflectors and third and fourth reflectors, respectively, at times when the reflector system is in the operative condition; and
- means for projecting a single image onto the light sensitive recording medium to produce a mono photograph at times when the reflector system is in the inoperative condition, said projecting means including a third lens for projecting the single image; and
- means for moving the reflector system between the operative and inoperative condition.

5. The camera of claim 4, wherein the projecting means includes an obturator moveably disposed to allow light to pass through the third lens at times when the reflector system is in the inoperative condition.

6. The camera of claim 5, further comprising a partition having an operative and inoperative condition, said partition being disposed adjacent the light sensitive recording medium in the operative position at times when the reflector system is in the operative mode to prevent the two images from overlapping and to produce a dividing line therebetween.

7. The camera of claim 4, further comprising a film holding section wherein the light sensitive recording medium is disposed, said film holding section projecting outwardly from the reflector system to prevent stray rays of light from being reflected by the reflector system onto the light sensitive recording medium.

8. The camera of claim 7, wherein the film holding section is detachable.

9. A camera for producing stereoscopic and mono photographic images, the camera comprising:
- a camera casing having a chamber formed therein;
- a reflector system housed within the chamber of the camera casing for projecting two images onto a light sensitive recording medium in side-by-side relationship to produce a stereograph, said reflector system having an operative and an inoperative condition, said reflector system being adjustable within the chamber of the camera casing between the operative and inoperative condition;
- means for projecting a single image onto the light sensitive recording medium to produce a mono photograph at times when the reflector system is in the inoperative condition; and
- means for adjusting the reflector system within the camera casing between the operative and inoperative condition.

10. The camera of claim 3, wherein the camera includes a single lens, the reflector system being in alignment with the single lens in the operative condition and being displaced out of alignment with the single lens when in the inoperative condition.

* * * * *

UNITED STATES PATENT AND TRADEMARK OFFICE
CERTIFICATE OF CORRECTION

PATENT NO.   :  5,349,403

DATED        :  September 20, 1994

INVENTOR(S)  :  Anthony Lo

It is certified that error appears in the above-identified patent and that said Letters Patent is hereby corrected as shown below:

On the title page, item [54] and column 1, line 2

In the title, change "STEROGRAPHIC" to --STEREOGRAPHIC--.

In the Abstract, line 6, change "print," to --print.--.

Signed and Sealed this

Fifteenth Day of November, 1994

Attest:

BRUCE LEHMAN

Attesting Officer         Commissioner of Patents and Trademarks